April 28, 1925.

S. TOUSEY

X RAY FILTER OR SCREEN

Filed Dec. 28, 1920

Inventor:
Sinclair Tousey,
by Spear, Middleton, Donaldson & Hall
Atty's.

Patented Apr. 28, 1925.

1,535,359

UNITED STATES PATENT OFFICE.

SINCLAIR TOUSEY, OF NEW YORK, N. Y.

X-RAY FILTER OR SCREEN.

Application filed December 28, 1920. Serial No. 433,682.

*To all whom it may concern:*

Be it known that I, SINCLAIR TOUSEY, a citizen of the United States, and resident of New York, N. Y., have invented certain new and useful Improvements in X-Ray Filters or Screens, of which the following is a specification.

My invention relates to X-ray apparatus and concerns particularly a filter for modifying the intensity of the X-rays upon certain parts of the subject in respect to other X-rays upon other parts of the subject.

Radiographs taken through a subject of varying thickness or density, in its different parts, will vary in clearness, and while they may be correct as to, for instance, the thinnest or least dense portion, they will be too slight for the denser or thicker portions of the subject.

It is the main object of my invention to vary the intensity of the X-radiations upon the subject so that equal radiographic effect may be secured through all parts of the subject, despite the fact that these various parts may be of different thicknesses and densities.

I show in the accompanying drawings some forms, as examples, of my invention—

In these drawings the X-ray tube is shown at A and the diagram shows by the dotted lines the X-rays emanating therefrom.

At a point intermediate the X-ray tube and the subject, I arrange the filter or screen B. This may be made of any suitable material, such, for instance, as aluminum, and in order to get the variable X-ray effect the screen or filter made of this material is of varying thickness, and in the example shown, this variation in thickness is obtained by bevelling the plate of aluminum at C, leaving the portion D of the full thickness. The screen is so positioned in relation to the subject that the X-rays which pass through the thicker or denser part of the subject will first pass through the thinner or less dense part of the screen, and conversely, the X-rays which are to pass through the thinner or less dense parts of the subject will first have to traverse the thicker or denser part of the screen, and thus the radiograph will be uniform, or substantially so, throughout.

Figures 1, 2:
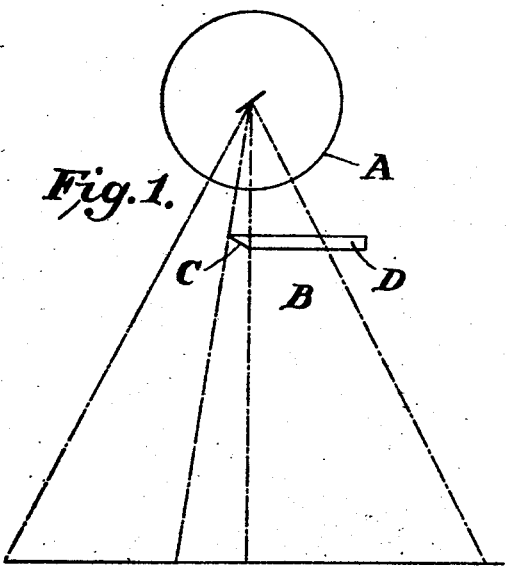
Fig. 1 is a diagrammatic view of an X-ray tube with my screen or filter associated therewith.

The screen may be of one piece of material, as shown in Figs. 1 and 2, and it may be bevelled or thinned at one edge or it may be thinned at both edges and it may be located in different positions amongst the X-rays according to the particular shape or nature of the subject, different subjects giving rise to different requirements as to variations in the intensity of the X-rays.

Figure 3:
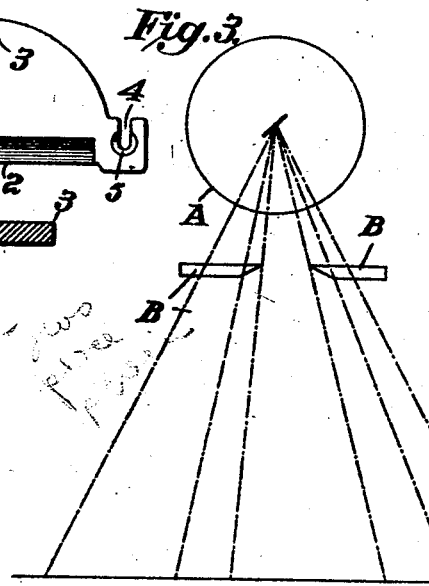
Figs. 2 and 3 are diagrammatic views of modifications.

The screen may be of two pieces, as indicated in Fig. 3, or this form may be of one piece with an opening therethrough having the bevelled edge.

The screen may be so positioned or of such construction that some of the X-rays will pass to the subject without passing through the screen at all. These unobstructed X-rays will go to and through the fully exposed thickest or densest portions of the subject.

A sheet or plate of material, say, one-fourth inch in thickness, presents the resistance, or obstruction, necessary for the thinnest part of the subject, and a bevel one-half inch wide down to a thin edge gives a gradation of X-ray intensity upon the subject, and without any sharp line of demarkation upon the picture.

Since there is commonly no sharp line of demarkation between the portions of the subject of varying thickness or density, the screen is constructed, for instance, by its bevelled formation, to vary the intensity of the X-radiation gradually upon the subject to secure the uniformity of the radiograph upon the sensitive plate.

As an example of the use of the invention, the apparatus may be used to take a radiograph of the foot, in which case the screen would be adjusted so that its thick or dense portion would obstruct the X-rays passing to the toes, while the rays passing to the instep would be unobstructed, and the rays intermediate those just mentioned would have to pass through the bevelled part or part of varying density, so that these rays would be of graduated intensity, the result being that the radiograph would present a substantially uniform picture throughout.

The screen may be so constructed as to give the greatest illumination at a central circle or along a middle strip, either longitudinally or transversely, or to provide for giving the least illumination at these parts.

All of the filters or screens referred to herein are useful in radiography and some are useful in radiotherapy, where different parts of the subject are at different distances from the X-ray tube, and therefore would receive different intensities from the rays if unobstructed or not screened.

Figure 4:
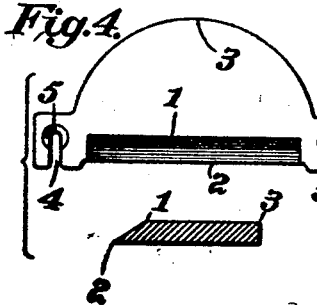
Figs. 4, 5, 6 and 7 are views of modified forms.

In Fig. 4 I show a form of filter or screen in which the bevelled part occurs between line 1 and the thin edge 2, the portion between 1 and 3 being of full thickness. Slots 4 and countersunk portions 5 enable this plate to be attached to the supporting frame of the tube by set screws.

Figure 5:

Fig. 5 shows a form in which both edges are bevelled.

Figure 6:

Fig. 6 shows a form having a central disc portion 6 of full thickness surrounded by a bevel portion 6'. Between this bevelled portion and the line 7 the screen is thin enough to be very transparent to the X-rays but still of sufficient rigidity. The terminal portion 8 is thicker and this is slotted to receive the fastening devices.

Figure 7:
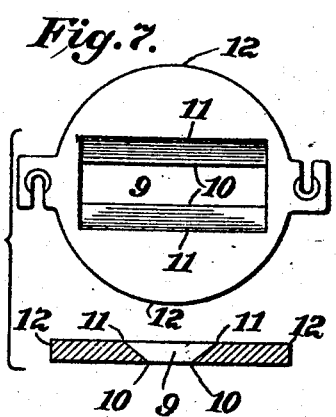

Fig. 7 shows another form with a central elongated opening 9 with bevelled portions between the thin edges 10 and the lines 11. From 11 to 12 on each side of the opening the plate is of full thickness.

The central opening may be circular bounded by a bevel portion beyond which the plate may be of the full thickness.

While I prefer to screen the X-rays by passing them through a plate of different thickness, I do not wish to limit myself in this respect, as the plate may be made up of parts of one thickness having varying degrees of transparency to X-rays.

The above description and drawings are to be considered as illustrative of my invention and not restrictive upon its scope.

I claim:

The process of obtaining a substantially uniform radiographic effect from X-rays transmitted through an object whose X-ray opacity is variable, which consists in additionally variably filtering the transmitted rays so that substantially the same obstruction is placed in the path of said rays over the entire field covered by the object.

SINCLAIR TOUSEY.

| Heinze | 743,718 | 250-35J X |
| Richardson | 1,447,430 | 250-341 |
| Cladwell | 1,227,884 | 250-35 |
| German Patent | 224,114 | 250-34 |
| Easten | 581,199 | 250-34 |
| Friedlander | 731,767 | 250-34 |
| French | 317,779 | 250-34 |
| French | 365,135 | 250-34 |